United States Patent [19]

Bourne, Jr.

[11] Patent Number: 4,624,469
[45] Date of Patent: Nov. 25, 1986

[54] THREE-WHEELED VEHICLE WITH CONTROLLED WHEEL AND BODY LEAN

[76] Inventor: Maurice W. Bourne, Jr., Rte. 1, Marquez, Tex. 77865

[21] Appl. No.: 810,976

[22] Filed: Dec. 19, 1985

[51] Int. Cl.$^4$ .......................................... B62D 9/02
[52] U.S. Cl. ............................ 280/112 A; 180/210; 280/772
[58] Field of Search ............. 280/112 A, 112 R, 111, 280/772; 180/210

[56] References Cited

U.S. PATENT DOCUMENTS

| | | |
|---|---|---|
| 627,523 | 6/1899 | Pennington . |
| 2,434,759 | 1/1948 | Donovan ........................ 280/124 |
| 3,746,118 | 7/1971 | Altorfer ........................... 180/25 |
| 3,934,668 | 1/1976 | Gerin ............................... 180/21 |
| 4,020,914 | 5/1977 | Trautwein ....................... 180/25 |
| 4,064,957 | 12/1977 | Parham ........................... 280/87 |
| 4,088,199 | 5/1978 | Trautwein ....................... 180/25 |
| 4,313,511 | 2/1982 | Soo Hoo .......................... 180/21 |
| 4,351,410 | 9/1982 | Townsend ....................... 180/210 |

FOREIGN PATENT DOCUMENTS

| | | | |
|---|---|---|---|
| 744333 | 11/1943 | Fed. Rep. of Germany ...... | 180/210 |
| 775405 | 5/1957 | United Kingdom ........... | 280/112 A |

*Primary Examiner*—John J. Love
*Assistant Examiner*—Mark C. Dukes
*Attorney, Agent, or Firm*—I. C. Waddey, Jr.

[57] ABSTRACT

The specification discloses a three-wheeled vehicle with a steering mechanism configured and arranged to provide driver-controlled wheel and body lean as the vehicle is making a turn. A cradle is rotatably mounted at the front of the vehicle for rotation about an axis generally longitudinal relative to the body. An axle connected to the cradle is perpendicular to the axis of rotation of the cradle and a spindle is pivotally connected to each end of the axle. A wheel is rotatably mounted on each spindle. A tie rod pivotally connected at its ends to the spindles is held in a selected position about the axis of the axle by a tie rod linkage. A coupler rotatably connects the linkage to the body. The linkage is also rotatably connected to the axle for rotation about an axis perpendicular to the axle to move the tie rod laterally. When the linkage is disposed to hold the tie rod forward of the axle, a force causing rotation of the movement of the tie rod laterally produces a conventional turning effect. When the linkage is disposed to hold the tie rod vertically above the axle, movement of the tie rod laterally causes the body to rotate about its connection to the cradle by virtue of the coupler, and causes the wheels to lean, producing simultaneous wheel and body lean. Locating the linkage to hold the tie rod in an intermediate position produces a combined leaning and turning effect.

12 Claims, 9 Drawing Figures

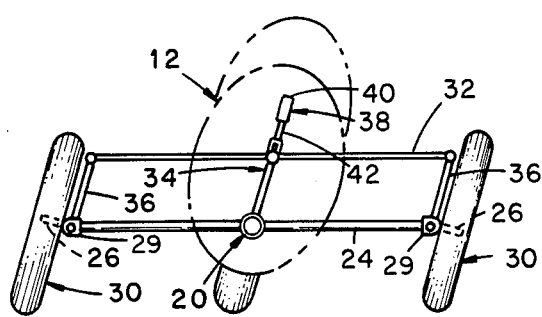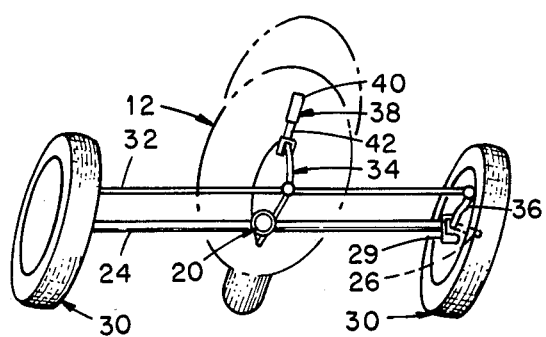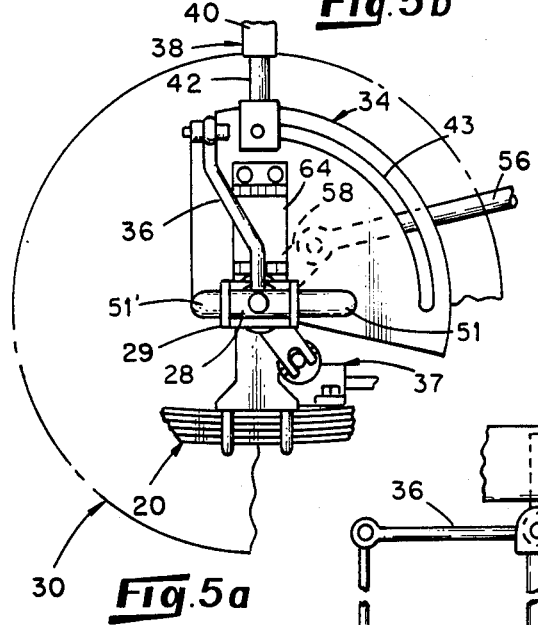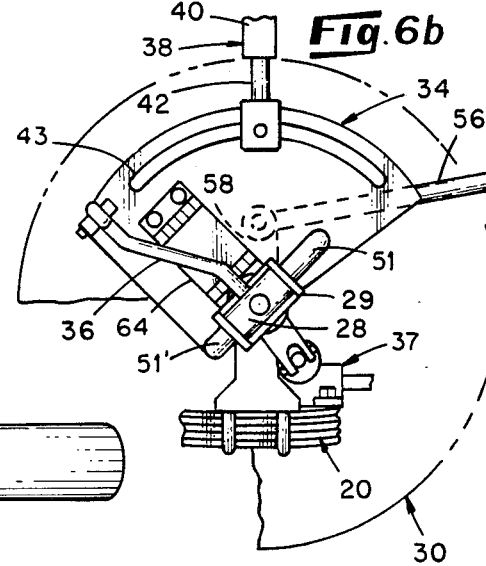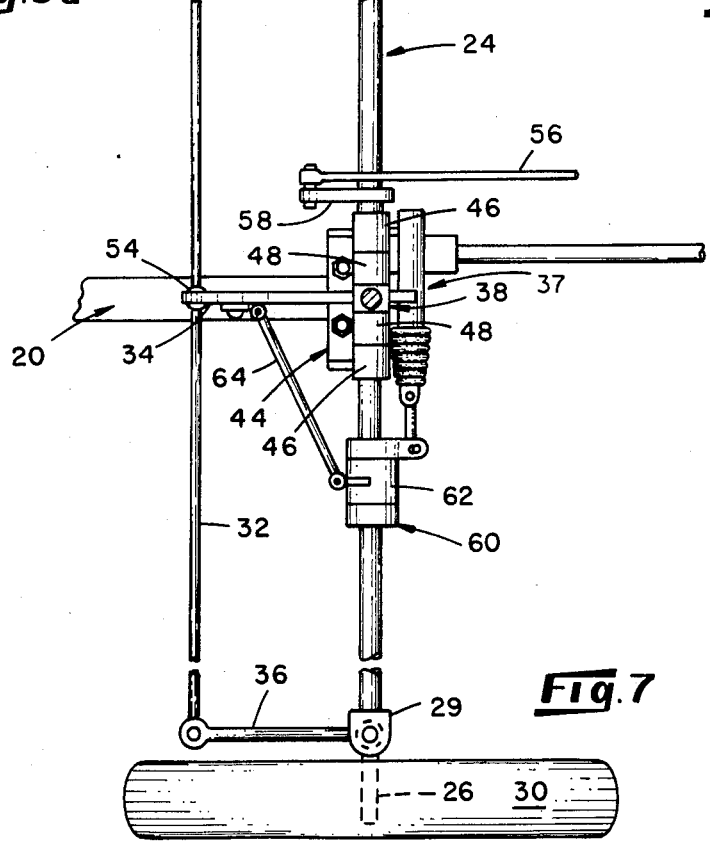

THREE-WHEELED VEHICLE WITH CONTROLLED WHEEL AND BODY LEAN

The present invention relates to three-wheeled vehicles and more specifically relates to a three-wheeled vehicle configured with a steering mechanism operable to achieve driver-controlled wheel and body lean while the vehicle is making a turn.

It has long been an object of vehicle designers to incorporate structure and mechanisms into vehicles in such a manner as to compensate for the undesirable effects of centrifugal force which occur when vehicles make moving turns. The compensating effect of "leaning" a vehicle during a turn was noticed early on in the case of two-wheeled vehicles. With the onset of three and four-wheeled vehicles it was thought that effecting a lean required mechanical alteration of the undercarriage or steering mechanism, or both, in a substantial manner in order to achieve any kind of beneficial results. For example, it was disclosed early on in U.S. Pat. No. 627,523 to Pennington that by use of a driver-controlled chain mechanism either of two front wheels could be raised or lowered to cause the driver portion of the vehicle to tilt. Pennington also showed how the frame could be connected to the steering mechanism by gears so that turning the steering mechanism caused the frame to tilt. A similar effect was shown in U.S. Pat. No. 3,746,118 to Altorfer where a linear activator is disclosed for effecting a lean of the frame, to which a single rear wheel is attached, but where the two front wheels at all times remain vertical. The disadvantages of Altorfer are that the front wheels remain vertical which detracts from the otherwise beneficial results of having a lean effect, and makes the vehicle more unstable. And Pennington's apparatus is illsuited for modern motorized vehicle applications.

Several others have devised three-wheeled vehicles which do employ both wheel and body lean. One such vehicle is disclosed in U.S. Pat. Nos. 4,020,914 and 4,088,199 to Trautwein which shows a wheel and body lean induced by the force of a foot of the driver on a foot platform. And U.S. Pat. No. 4,351,410 to Townsend shows a three-wheeled vehicle with wheel and body lean induced by a device capable of sensing the presence and direction of centrifugal force and effecting corresponding lean of the vehicle in the opposite direction. Both Trautwein and Townsend rely on complicated and unconventional arrangements which are not appealing to the average user or to manufacturers.

Accordingly, there exists a need for a vehicle having a simple and efficient mechanism capable of inducing wheel and body lean to compensate for the undesirable and often dangerous effects exerted on the vehicle by centrifugal force when the vehicle is making a turn.

The present invention meets this need and solves the foregoing and other problems long associated with vehicles designed to compensate for centrifugal effects by providing a three-wheeled vehicle having a steering mechanism which is capable of inducing adjustable simultaneous wheel and body lean with a simple and efficient arrangement of parts easily adaptable to conventional front-end assemblies.

In accordance with the present invention a three-wheeled vehicle with controlled wheel and body lean is provided having an elongate body with a longitudinal axis and a wheel rotatably mounted on one end of the body generally along the longitudinal axis of the body. A cradle is rotatably mounted on the body for rotation about a generally longitudinal axis relative to the body. An axle connected to the cradle has an axis generally perpendicular to the axis of rotation. A spindle is attached to each of the opposite ends of the axle for at least pivotal motion of each spindle relative to the axle. A wheel is rotatably mounted on each of the spindles. A tie rod pivotally connects the spindles and has an axis generally parallel to the axis of the axle for controlling the pivotal motion of the spindles relative to the axle and is movable through an arc about the axle. The tie rod is connected to the spindles so that lateral movement generally parallel to the axis of the axle causes the spindle to pivot on the ends of the axle. A tie rod linkage holds the tie rod in a selected position disposed about the axis about the axle and is configured to move the tie rod to a position between a first position forward of the axle through an approximate 90 degree arc to a second position generally vertically above the axle, while providing for lateral movement of the tie rod generally parallel to the axis of the axle. A coupler rotatably connects the tie rod linkage to the body and provides for rotation of the tie rod linkage relative to the body about an axis generally perpendicular to the axis of rotation of the cradle relative to the body. Structure is provided for imparting a force to move the tie rod laterally so that when the tie rod is in the first position, lateral movement of the tie rod causes the spindles and wheels to pivot relative to the axle about an axis generally perpendicular to the axis of rotation of the cradle relative to the body, and when the tie rod is in the second position, lateral movement of the tie rod causes the spindles and wheels to pivot relative to the axle about an axis generally parallel to the axis of rotation to the cradle relative to the body and causes the body to rotate relative to the cradle. A linkage is provided for adjusting and holding the tie rod in any desired intermediate position along the 90 degree arc about the axle.

In accordance with another aspect of the present invention the tie rod linkage is an arcuate arm having opposite ends, one of which is pivotally connected to the tie rod and the other of which is rotatably connected to the axle. The rotatable connection between the tie rod linkage and the axle provides for rotation of the arcuate arm about an axis generally perpendicular to the axis of the axle.

In accordance with yet another aspect of the present invention the coupler is disposed relative to the arcuate arm so that the axis of rotation of the rotatable connection between the coupler and the arcuate arm is coaxial with the axis of rotation of the rotatable connection between the arcuate arm and the axle when the tie rod is in the first position, and is generally perpendicular to the axis of rotation of the rotatable connection of the arcuate arm and the axle when the tie rod is in the second position.

In accordance with a further aspect of the present invention, a three-wheeled vehicle with controlled wheel and body lean is provided having an elongate body with an longitudinal axis and a wheel rotatably mounted on one end of the body generally along the longitudinal axis of the body. A cradle is rotatably mounted on one end of the body for rotation about a generally longitudinal axis relative to the body and an axle is rotatably connected to the cradle so that the axis of rotation of the axle is generally perpendicular to the axis of rotation of the cradle relative to the body. A pair of wheel supports are located on opposite ends of the axle, each of the wheel supports being operable to support a wheel for pivotal motion relative to the axle. A wheel is rotatably mounted on each of the wheel supports. A tie rod is pivotally connected to each of the wheel supports on the opposite ends of the axle for lateral movement relative to the body and for movement generally parallel to the axis of the axle, so that lateral movement of the tie rod causes the wheel supports to pivot on the ends of the axle. A tie rod linkage links the tie rod to the axle and is rotatably connected to the axle for being rotated to move the tie rod laterally while holding the tie rod generally parallel to the axle. Structure is provided to rotate the axle in the cradle so that the tie rod linkage moves the tie rod about the axis of the axle to the positions between a first position with the tie rod forward of the axle through an approximately 90 degree arc to a second position with the tie rod generally vertically above the axle. A coupler rotatably connects the tie rod linkage to the body and is configured to provided for rotation of the tie rod linkage relative to the body about an axis generally perpendicular to the axis of rotation of the the cradle relative to the body. Structure is provided for imparting a force to rotate the tie rod linkage to move the tie rod laterally so that when the tie rod is in the first position, lateral movement of the tie rod causes the wheel supports and wheels to pivot relative to the axle about a generally vertical axis, and when the tie rod is in the second position, lateral movement of the tie rod causes the wheel supports and wheels to pivot relative to the axle about a generally horizontal axis and causes the linkage to act against the coupling means so that the body rotates relative to the axle.

The advantages and further aspects of the present invention will be readily appreciated by those of ordinary skill in the art as the same becomes better understood by reference to the following detailed description when considered in conjunction with the accompanying drawings in which:

FIG. 5a is a side view illustrating the orientation of the tie rod linkage and tie rod about the axle to cause the wheels and body of the vehicle to lean;

FIG. 5b is a diagrammatical illustration showing the wheel and body lean induced by the orientation of the tie rod and tie rod linkage illustrated in FIG. 5a;

FIG. 6a is a side view illustrating the orientation of the tie rod and tie rod linkage about the axis to produce a combined turning and leaning effect;

FIG. 6b is a front diagrammatical view of the vehicle illustrating a combined turning and leaning effect as induced by the orientation of the tie rod linkage and tie rod illustrated in FIG. 6a; and FIG. 7 is a top view of the front end portion with the body cut away illustrating the relationship and orientation of the tie rod, axle, tie rod linkage and other aspects of the invention.

Figure 1:
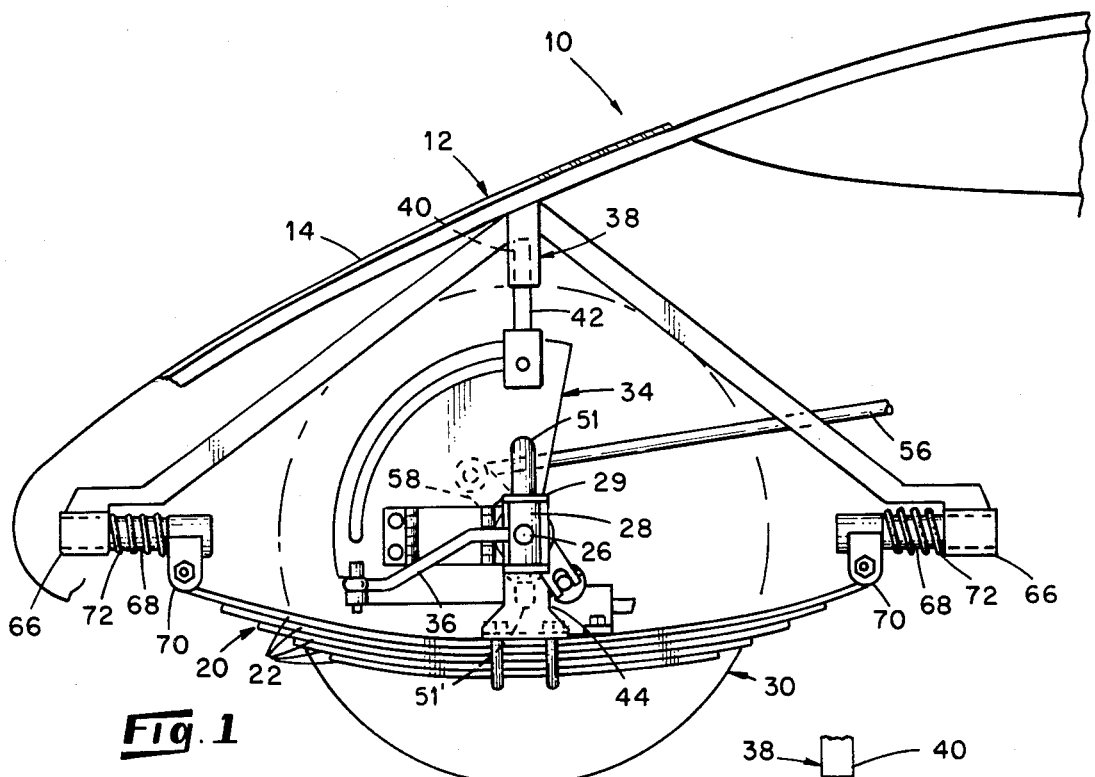
FIG. 1 is a side view of the front portion of the three-wheeled vehicle illustrating the connection of a cradle to the body, a tie rod linkage and various other aspects of the present invention with certain parts cut away to show details.
Figure 4:
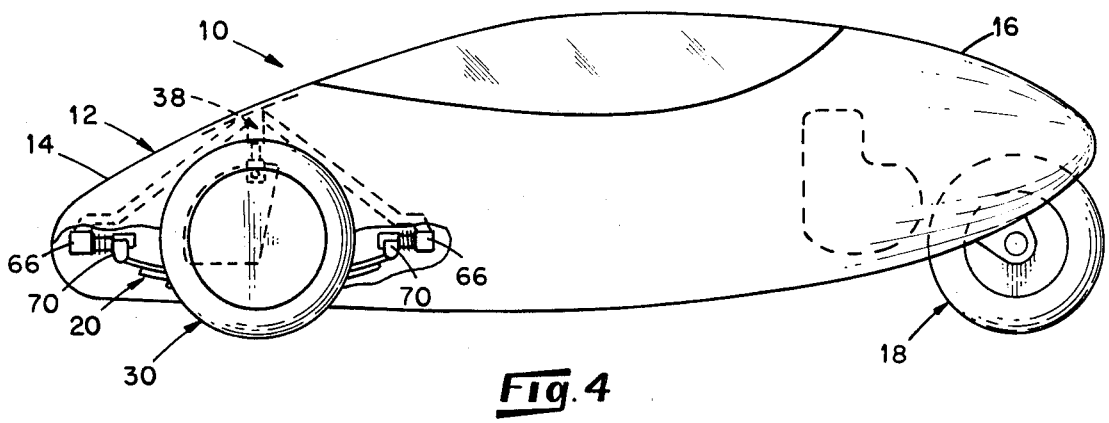
FIG. 4 is a side view of the three-wheeled vehicle.

Referring now to the drawings in which like reference characters indicate like or similar parts throughout the several views, there is shown in FIGS. 1 through 7 a preferred embodiment of the present invention. A three-wheeled vehicle 10 is configured with a steering mechanism which makes it possible for the driver to control the wheel and body lean to lessen or eliminate the effect of centrifugal forces exerted on the vehicle and driver during turns. The vehicle 10 comprises an elongate body 12 having a front end 14 and rear end 16 with a longitudinal axis. A rear wheel 18 is rotatably mounted to support the rear end 16 of the vehicle 10 and is centered transversely at the rear 16 along the longitudinal axis of the body 12. A cradle 20 depicted principally in FIGS. 1 and 4 is constructed of leaf springs 22 and is rotatably connected to the front end 14 at the front and rear of the top leaf spring 22. The connection of the cradle 20 in this manner provides a preferred means for rotational movement of the cradle 20 about a generally longitudinal axis relative to the body 12.

A front axle 24 (viewable in FIGS. 2 and 3) is connected to the cradle 20 so that the axis of the axle 24 is generally perpendicular to the axis of rotation of the cradle 20. A preferred means for supporting wheels on the axle 24 is provided by a pair of spindles 26 connected to opposite ends of the axle 24. The spindles 26 are pivotally connected to each end of the axle 24, preferably by means of king pins 28 which are oriented generally perpendicular to the axle 24 and located in clevises 29 connected to the ends of the axle 24. A pair of front wheels 30 are rotatably mounted on each of the spindles 26.

Figures 2, 3:
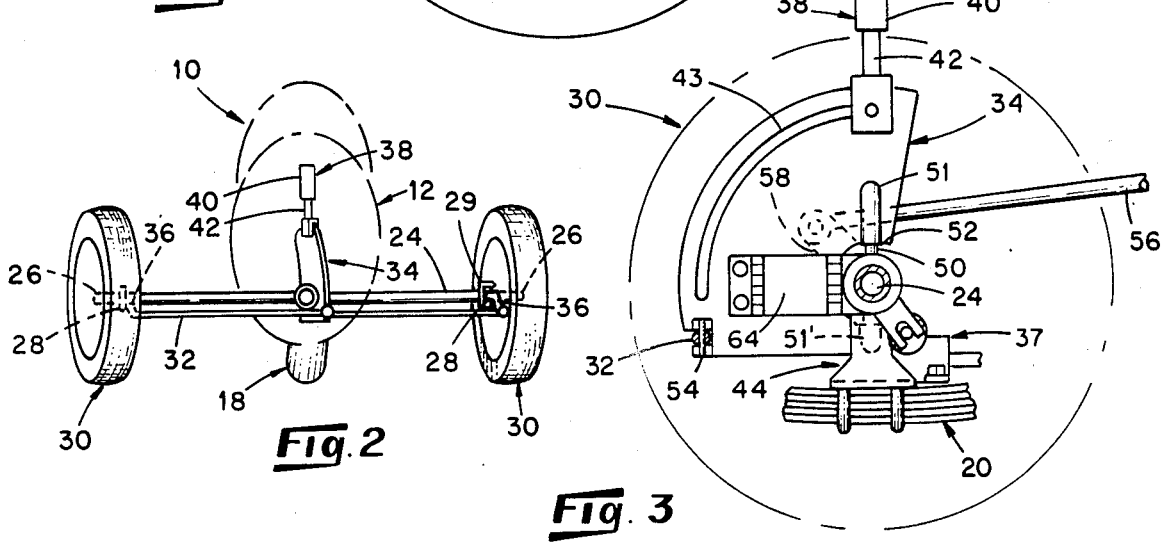
FIG. 2 is a diagrammatical illustration showing the operation of the tie rod and tie rod linkage in turning the wheels to the left in a conventional manner.
FIG. 3 is a side view of the tie rod and tie rod linkage oriented about an axle to direct the wheels in a conventional turning manner as shown in FIG. 2.

A tie rod 32 (viewable in FIGS. 2 and 3) is oriented with an axis generally parallel to the axis of axle 24 for controlling the pivotal motion of the spindles 26 relative to the axle 24. The tie rod 32 is movable through an arc about the axle 24 by means of a tie rod linkage 34 which is operable to hold the tie rod 32 in a selected position about the axis of the axle 24. The linkage 34 is further operable to move the tie rod 32 to positions between a first position with the tie rod 32 disposed forward of the axle 24 through an approximately 90 degree arc to a second position with the tie rod 32 disposed generally vertically above the axle 24. The linkage is suitably formed in the shape of an arcuate arm as best seen in FIGS. 1 and 3 having a fan-like configuration. Lateral movement of the tie rod 32 relative to the axle 24 is preferably provided by rotatably connecting the linkage 34 to the axle 24 for rotation about an axis generally perpendicular to the axis of the axle 24. In this manner, rotation of the linkage 34 about its connection to the axle 24 causes lateral movement of the tie rod 32 relative to the body 12 and generally parallel to the axis of the axle 24.

The ends of the tie rod 32 are pivotally connected to the spindles 26 so that lateral movement of the tie rod 32 causes the spindles 26 to pivot on the ends of the axle 24. This connection is preferably provided by guide linkages 36 extending perpendicularly from the king pins 28.

A suitable means for imparting a force to move the tie rod 32 laterally is provided by the rack and pinion arrangement 37 best seen in FIG. 7. Description and discussion of the conventional aspects of the vehicle 10 such as the engine, transmission, drive train, seating arrangements and steering wheel has been omitted as these are of a type ordinarily used in three-wheeled vehicles where the engine power is used to drive the rear wheel. Moreover, it is assumed that all moving, rotating or pivoting connections or abuttments are fitted with proper bearings or other suitable friction reducing devices and discussion of such aspects will be omitted.

With reference now to FIGS. 1 through 6, the operation of the vehicle 10 and its leaning function can best be understood by following the movement of the tie rod 32 though the ninety degree arc and its resultant effect on the attitude of the front wheels 30 relative to the road surface (not shown).

Generally, as the driver turns the wheel (not shown) a force is imparted to move the tie rod laterally relative to the body 12 and generally parallel to the axle 24. When the tie rod 32 is disposed forwardly of the axle 24, the vehicle 10 responds in the conventional manner, i.e., lateral movement of the tie rod 32 causes the spindles and wheels to pivot relative to the axle about a generally vertical axis turning the vehicle to the right or the left. In this configuration, centrifugal forces have a substantial effect on the driver and vehicle 10 since the forces are essentially perpendicular to the motion of the vehicle 10. Other than the friction of the vehicle against the road surface, there is essentially no force to counteract the centrifugal force because the center of gravity of the vehicle 10 is vertically aligned with its reaction to the surface.

It is thus apparent that introduction of a force in opposition to the centrifugal force would aid in overcoming the undesirable effects of the latter. One such force is imposed by banking roadways. But as is often the case, banking is either inadequate or nonexistent in many roadways. Another force lies at the disposal of the vehicle designer and involves introduction of a lean in the vehicle. When the wheels and body of a vehicle are made to lean, the center of gravity is shifted so that it is not aligned with the reaction force of the surface. The resulting torque can be balanced against the centrifugal force to make the vehicle seem at equilibrium while moving in a circular path. Leaning also lowers the center of gravity which, because of a "lever effect", increases the amount of centrifugal force that would be required to tip the vehicle over.

According to the concepts discussed above, and others, the present invention provides a means for balancing the weight-shifting torque against the centrifugal force. As seen in FIG. 5, when the tie rod 32 is generally vertically above the axle 24, lateral movement of the tie rod 32 causes the splindles 26 and wheels 30 to pivot relative to the axle 24 about a generally horizontal axis which is also generally parallel to the axis of rotation of the body 12 relative to the cradle 20. This causes the wheels 30 to "lean".

The introduction of body 12 "lean" is accomplished by coupling the linkage 34 to the body 12 by means of a coupler 38. A receiver portion 40 of the coupler 38 is stationary relative to the body 12 and a holder portion 42 rotatably and telescopically received by the receiver 40 is slidably connected at its lower end to the tie rod linkage 34. When the tie rod linkage 34 is rotated about the axle 24 to move the tie rod through the arc, the holder 42 slides in a slot 43 formed in the linkage 34. A part of the holder 42 not shown engages the linkage 34 on the opposite side of the slot thereby holding the linkage 34 in contact with the coupler 38.

Thus, the coupler 38 does not restrict rotation of the linkage 34 about the axis of the axle 24 to move the tie rod 32 to any position intermediate being forward of the axle 24 or vertically above the axle 24. Nor does the coupler 38 transfer any force imposed by the rack and pinion arrangement 37 to impart a body lean when the tie rod 32 is forward of the axle 24 as in FIGS. 1 through 3 because of the rotation of the holder 42 in the receiver 40. But as can be seen in FIG. 5b, when the tie rod 32 is above the axle 24, the holder 42 will not rotate in the receiver 40. Recalling that the linkage 34 is connected to the axle 24 for rotation about an axis perpendicular to the axle 24, and that this axis of rotation is generally parallel to the axis of rotation of the spindles 26 and wheels 30, it is seen that when the tie rod 32 is above the axle 24 so that the spindles 26 and wheels 30 rotate about a generally horizontal axis, the linkage 34 rotates likewise. In this configuration, rotation of the linkage 34 (to the right as seen in FIG. 5b) causes the body 12 to rotate about the cradle 20 because the effect of the coupling 38 here is to make the wheels 30, spindles 26, and body 12 rotate in unison. At the other extreme, as shown in FIG. 2, the body 12, spindles 26, and wheels 30 do not "lean" because the linkage 34 rotates co-axially with the receiver portion 40 of the coupler 38.

At any intermediate positions of the linkage 34 and tie rod 32 about the axle 24, a combination leaning and turning effect is achieved. For example, as shown in FIG. 6, when the linkage 34 and tie rod 32 are positioned so that the tie rod 32 is disposed at about a forty five degree angle relative to the longitudinal axis of the vehicle 10, the wheels 30 and body 12 "lean" about half as much as when the tie rod 32 is above the axle 24. And the wheels 30 only "turn" about half as much as when the tie rod 32 is in front of the axle 24.

Thus, it will be appreciated that by proper positioning of the tie rod 32, the "lean" effect can be varied from having essentially no lean to having total wheel and body lean.

Referring now to FIGS. 1, 3 and 7, an axle support 44 is shown bolted to the lowermost portion of the cradle 20 and, as best seen in FIG. 7, has a pair of sleeve members 46 through which the axle 24 passes. The sleeve members 46 are separated by a linkage collar 48 coaxially disposed on the axle 24. The connection of the linkage 34 to the axle 24 is accomplished by use of a trunnion 50 which is viewable in FIG. 3. The trunnion 50 passes through an opening drilled in the axle 24 (opening not shown) which is perpendicular to the axis of the axle 24 and is formed midway along its length. The linkage collar 48 also has an opening (not shown) formed perpendicular to its rotational axis which is aligned with the opening in the axle 24 so that the trunnion 50 passes through both the collar 48 and the axle 24. The linkage 34 is configured to receive the trunnion 50 so that when the linkage 34 is oriented with the tie rod 32 forward of the axle 24, as shown in FIG. 3, the trunnion 50 is approximately vertical. The trunnion 50 passes into the linkage 34 on opposite sides of the axle 24 providing for rotation of the linkage 34 about an axis which is perpendicular to, and intersects with, the axis of the axle 24. Provision is made to pass the trunnion 50 into the linkage 34 from the bottom of the linkage 34, through the collar 48 and the axle 24, and into the upper part of the linkage 34 with appropriate means being employed to secure the trunnion 50 in place. A pair of trunnion bearing bosses 51 and 51' receive opposite ends of the trunnion 50 on opposite sides of the axle 24.

A circular cut 52 in the linkage 34 receives therein the axle 24 and collar 48 and has a diameter larger than that of the collar 48 by a sufficient amount to prevent the collar 48 from interfering with rotation of the linkage 34 on the trunnion 50.

Referring specifically to FIGS. 3 and 7, the tie rod 32 is shown connected midway along its length to the lower outer edge of the linkage 34. The connection is suitably provided by a pin 54 passing through the tie rod 32 perpendicular to the length of the tie rod 32 which is secured to the linkage 34 on opposite sides of the tie rod 32. When the linkage 34 rotates to move the tie rod 32 laterally, the angle between the tie rod 32 and the linkage 34 on the side of the linkage 34 in the direction of its rotation becomes obtuse and the angle between the tie rod 32 and linkage 34 on the opposite side becomes acute (see for example FIG. 5b). Thus, the connection between the tie rod 32 and linkage 34 serves the function of a pivoting hinge which ties movement of the linkage 34 and tie rod 32 together.

With continued reference to FIGS. 1, 3 and 7 and additionally FIGS. 5 and 6, there is shown a rotator linkage 56 pivotally connected to an arm 58 extending from the axle 24. The connection of the rotator linkage 56 and arm 58 is best shown in FIG. 7. The arm 58 extends from the axle 24 in a plane perpendicular to the axis of the axle 24 and is preferably rigidly connected to the axle 24. The arm 58 extends from the axle in such a manner that when the linkage 34 is in a position with the tie rod 32 forward of the axle 24 as shown in FIG. 3, the arm 58 makes about a forty-five degree angle with horizontal and is forward of the axle 24. The arm 58 is displaced laterally from the tie rod linkage 34 by a sufficient amount so that the arm 58 and rotator linkage 56 do not interfere with movement of the tie rod linkage 34.

Suitable means for allowing the driver to move the linkage 56 rearwardly and forwardly are provided and for holding the linkage 56 in a desired position (not shown). It will be seen by comparing FIGS. 3, 5a and 6a that movement of the linkage 56 causes the axle 24 to rotate in the sleeves 46 moving the tie rod linkage 34 and tie rod 32 through an arc about the axle 24. For example, when the driver causes the linkage 56 to be moved from its position shown in FIG. 3 to the position shown in FIG. 6a, a corresponding movement of the tie rod linkage 34 and tie rod 32 is observed. Continued movement of the linkage 56 to the position shown in FIG. 5a finds the tie rod 32 disposed above the axle 24 where the maximum "lean" effect is achieved as depicted in FIG. 5b.

Referring now to FIG. 7, a steering collar 60 is shown slidably disposed on the axle 24 and connected to the rack and pinion assembly 37. A sleeve 62 located on the collar 60 is configured to rotate when the tie rod linkage 34 and tie rod 32 are moved through an arc about the axle 24. The sleeve 62 is required to be independently movable in this manner because the collar 60 itself is attached to the rack and pinion assembly 37 which does not rotate. The tie rod linkage 34 is hingedly attached to the sleeve 62 by means of a hinge arm 64 having hinged connections at its opposite ends to the sleeve 62 and linkage 34, respectively. When the collar 60 is made to move laterally along the axle 24 it is seen that the hinge arm 64 either pushed or pulls the linkage 34, depending on the direction of movement of the collar 60, to cause the linkage 34 to rotate on the trunnion 50 about an axis perpendicular to the axle 24. Moreover, it is seen that as the rotator linkage 56 is moved to rotate the axle 24, the tie rod linkage 34 and tie rod 32, the sleeve 62 rotates in the steering collar 60. Thus, the rack and pinion assembly 37 is operable to cause rotation of the tie rod linkage 34 and consequent lateral movement of the tie rod 32 to pivot the spindles 26 and wheels 30 at any position of the tie rod linkage 34 within the arc about the axle 24.

A number of possible refinements of the present invention are possible. For example, a power assist hydraulic system could be employed to drive the rack and pinion assymbly 37. A similar-type power system could be used to move the rotator linkage 56. This latter power system would suitably be actuated by a thumb actuated "trim switch" (not shown) mounted adjacent the steering wheel.

Referring again to FIG. 1, the rotatable connection between the body 12 and cradle 20 is illustrated to comprise fore and aft bearing blocks 66 from which extend support shafts 68 that are rotatable within the blocks 66. Thus, as described above, when the tie rod linkage 34 is moved from its position holding the tie rod 32 forward of the axle 24, so that the axis of rotation of the linkage 34 about the trunnion 50 is no longer co-axial with the axis of rotation of the holder 42 in the receiver 40, body and wheel "lean" are induced by the force of the linkage 34 on the coupling 38. This "lean" results when the body 12 is made to rotate at the bearing blocks 66 relative to the cradle 20; and the amount of "lean" is proportional to angle between the axis of rotation of the linkage 34 about the trunnion 50 and the axis of rotation of the holder 42 in the receiver 40. It is observed that when the two axis are co-axial no lean is effected and when they make a ninety degree angle with each other the maximum lean in achieved.

Numerous other possible arrangements could be devised for achieving the controlled lean effect of the present invention. For example, and not by way of limitation, the rotator linkage 56 could be pivotally connected to the tie rod linkage 34, provision being made to prevent the rotator linkage 56 from interfering with rotation of the tie rod linkage 34 about the trunnion 50. Or, the rotator linkage 56 could be attached to the tie rod 32 itself by use of a universal joint. Another variation would include having the axle 24 stationary and allowing the ends to rotate such as having a rotatable connection between the clevises 29 and the axle 24. In this variation, the trunnion 50 would not be required as the tie rod linkage 34 would be made to rotate on the axle 24 rather than rotating with it when the tie rod 32 is to be moved about the axle 24. Here, the rotator linkage 56 would be connected to the tie rod linkage 34 or the tie rod 32 as described above, rather than to the axle 24. Similarly, other suitable means for applying force to move the tie rod linkage 34 would suffice as would many other arrangements and configurations of the tie rod linkage 34 and coupler 38 so long as the linkage and coupling used were operable to achieve the controlled wheel and body lean effect in the manner described above.

Another aspect of the present invention involves the use of a pair of torsion coil springs 72 located adjacent the bearing blocks 66 shown in FIG. 1. The springs 72 are preferably located around the support shafts 68 which extend into the bearing blocks 66. One end of each spring 72 is secured to the adjacent block 66 and the other end is secured to the support shaft 68 adjacent the bracket 70. The springs 72 provide a preferred means for biasing the "lean" of the body 12 and wheels 30 to improve the driver's control of the vehicle 10 and to prevent the vehicle 10 from falling over on its side should the weight-shifting torque caused by the lean overcome the centrifugal force while rounding a curve. Accordingly, the springs 72 are designed to provide sufficient torsion to overcome the tendency of the vehicle 10 to fall over on its side due solely to shifting of weight during a lean. But the torsion is not so strong as to overcome the force applied by the driver when turning the wheel to effect a lean. Also, provision should be made to reduce the speed at which the body 12 and wheels 30 return to an upright position if, for example, the wheel should slip out of the hands of the driver. Such a measure would be required to prevent accidental upsetting of the equilibrium of the vehicle 10 which might result if the vehicle 10 were "whipped" into an upright orientation during a turn. The springs 72 serve an additional function of allowing resilient extension of the leaf spring 20 when the support shafts 68 slide longitudinally within the brackets 66 as the leaf spring 20 flexes.

Although particular embodiments of the present invention have been described in the foregoing detailed description it will be understood that the invention is capable of numerous rearrangements, modifications, and substitutions of parts without departing from the scope of the invention as set forth in the claims below.

What is claimed is:

1. A three-wheeled vehicle with controlled wheel and body lean having an elongate body with a longitudinal axis and a wheel rotatably mounted on one end of the body generally along the longitudinal axis of the body, comprising:

a cradle rotatably mounted on the body for rotation about a generally longitudinal axis relative to the body;

an axle connected to said cradle having an axis that is generally perpendicular to the axis of rotation of said cradle;

a pair of spindles, each spindle being connected to one of the opposite ends of said axle, respectively;

a pair of wheels, each wheel being rotatably mounted on one of said spindles, respectively;

means for connecting each of said spindles to said axle for providing at least pivotal motion of said spindles relative to said axle;

a tie rod having an axis generally parallel to the axis of said axle for controlling the pivotal motion of said spindles relative to said axle, said tie rod being movable through an arc about said axle;

means for pivotally connecting the ends of said tie rod to said spindles so that lateral movement of said tie rod generally parallel to the axis of said axle causes said spindles to pivot on the ends of said axle;

tie rod linkage means for holding said tie rod in a selected position disposed about the axis of said axle, and being configured to provide motion of said tie rod to positions between a first position forward of said axle through an approximately 90 degree arc to a second position generally vertically above said axle, while providing for lateral movement of said tie rod generally parallel to the axis of said axle;

coupling means for rotatably connecting said tie rod linkage to the body, said coupling means providing for rotation of said tie rod linkage relative to the body about an axis generally perpendicular to the axis of rotation of said cradle relative to the body; and steering means for imparting a force to move said tie rod laterally so that when said tie rod is in said first position, lateral movement of said tie rod causes said spindles and wheels to pivot relative to said axle about an axis generally perpendicular to the axis of rotation of said cradle relative to the body, and when said tie rod is in said second position, lateral movement of said tie rod causes said spindles and wheels to pivot relative to said axle about an axis generally parallel to the axis of rotation of said cradle relative to the body and causes the body to rotate relative to said cradle; and adjustment means for adjusting and holding said tie rod in any desired intermediate position along said 90 degree arc.

2. The three-wheeled vehicle of claim 1, wherein said linkage means is an arcuate arm having opposite ends, one end of which is pivotally connected to said tie rod and the other end of which is rotatably connected to said axle.

3. The three-wheeled vehicle of claim 2, wherein said arcuate arm is rotatably connected to said axle for rotation about an axis generally perpendicular to the axis of said axle.

4. The three-wheeled vehicle of claim 3, wherein said coupling means is disposed relative to said arcuate arm so that the axis of rotation of said rotatable connection between said coupling means and said arcuate arm is co-axial with the axis of rotation of said rotatable connection between said arcuate arm and said axle when said tie rod is in said first position, and is generally perpendicular to the axis of rotation of said rotatable connection between said arcuate arm and said axle when said tie rod is in said second position.

5. The three-wheeled vehicle of claim 4, further comprising:

a slot formed in said arcuate arm for receiving said coupling means so that as said arcuate arm moves through said approximately 90 degree arc, said coupling means holds said arcuate arm to vary the lean of said vehicle and wheels imposed by said steering means, depending on the position of said tie rod in said 90 degree arc; and said coupling means, comprising:

a holder for being received by said slot to restrain lateral movement of said arcuate arm except by means of rotation said arcuate arm about said axle; and a receiver attached to the body for rotatably and telescopically receiving said holder so that said holder is free to rotate relative to said receiver as said arcuate arm rotates about its connection to said axle.

6. A three-wheeled vehicle with controlled wheel and body lean, having an elongate body with a longitudinal axis and a wheel rotatably mounted on one end of the body generally along said longitudinal axis of the body, comprising:

a cradle rotatably mounted on one end of the body for rotation about a generally longitudinal axis relative to the body;

an axle rotatably connected to said cradle so that the axis of rotation of said axle is generally perpendicular to the axis of rotation of said cradle relative to the body;

a pair of wheel supports located on opposite ends of said axle, each of said wheel supports operable to support a wheel for pivotal motion relative to said axle;

a pair of wheels, each wheel being rotatably mounted on one of said wheel supports;

a tie rod pivotally connected to each of said wheel supports on opposite ends of said axle for lateral movement relative to the body and for movement generally parallel to the axis of said axle, so that lateral movement of said tie rod causes said wheel supports to pivot on the ends of said axle;

a tie rod linkage for linking said tie rod to said axle, said linkage being rotatably connected to said axle for being rotated to move said tie rod laterally while holding said tie rod generally parallel to said axle;

means for rotating said axle in said cradle so that said tie rod linkage moves said tie rod about the axis of said axle to positions between a first position with said tie rod forward of said axle through an approximately 90 degree arc to a second position with said tie rod generally vertically above said axle;

coupling means for rotatably connecting said tie rod linkage to the body, said coupling means configured to provide for rotation of said tie rod linkage relative to the body about an axis generally perpendicular to the axis of rotation of said cradle relative to the body; and steering means for imparting a force to rotate said tie rod linkage to move said tie rod laterally so that when said tie rod is in said first position, lateral movement of said tie rod causes said wheel supports and wheels to pivot relative to said axle about a generally vertical axis, and when said tie rod is in said second position, lateral movement of said tie rod causes said wheel supports and wheels to pivot relative to said axle about a generally horizontal axis and causes said linkage to act against said coupling means so that the body rotates relative to said cradle.

7. The three-wheeled vehicle of claim 6, further comprising means for holding said tie rod in any desired intermediate position along said 90 degree arc.

8. The three-wheeled vehicle of claim 6, wherein said tie rod linkage is an arcuate arm pivotally connected to said tie rod so that said tie rod remains generally parallel to said axle when said linkage is rotated relative to said axle.

9. The three-wheeled vehicle of claim 8, further comprising:

each of said wheel supports comprising:

a clevis mounted on the end of said axle;

a king pin rotatably mounted on said clevis for rotation about an axis generally perpendicular to the axis of said axle;

a spindle extending generally perpendicularly from said king pin for supporting said wheel for rotation; and a guide linkage extending generally perpendicularly from said king pin and said spindle, said tie rod having one end pivotally connected to said guide linkage; and said king pins being mounted on said axle so that the axis of rotation of said king pins are parallel.

10. The three-wheeled vehicle of claim 6, wherein said rotatable connection between said cradle and the body comprises means for biasing rotational movement of the body relative to said cradle to prevent the vehicle from falling to one side or the other when rotation of said tie rod linkage causes the body to rotate relative to said cradle.

11. The three-wheeled vehicle of claim 10, wherein said cradle comprises:

an arcuate transverse member having opposite ends rotatably connected to the body for rotation of said cradle about an axis longitudinal relative to the body;

a pair of axle supports extending laterally upwardly from opposite sides of the approximate center of said arcuate transverse member; and each of said axle supports having co-axially disposed passages for receiving therethrough said axle so that the axis of said axle passes through and is perpendicular to the axis of rotation of said cradle in the body.

12. The three-wheeled vehicle of claim 11, wherein said steering means comprises:

a steering collar slidably mounted on said shaft for lateral movement on said shaft;

a hinge arm connecting said collar to said tie rod linkage, said steering linkage being hingedly connected to said tie rod linkage and being rotatably and pivotally connected to said collar, so that when said tie rod linkage is moved by rotation of said axle, said hinge arm rotates about said collar to follow movement of said tie rod linkage; and means for imparting a lateral force to move said collar laterally on said axle so that said tie rod linkage is rotated on said axle.

* * * * *